(12) United States Patent
Yang et al.

(10) Patent No.: US 12,457,806 B2
(45) Date of Patent: Oct. 28, 2025

(54) ARRAY SUBSTRATE, DISPLAY PANEL AND DISPLAY DEVICE

(71) Applicants: Wuhan BOE Optoelectronics Technology Co., Ltd., Hubei (CN); BOE TECHNOLOGY GROUP CO., LTD., Beijing (CN)

(72) Inventors: Xiaoguang Yang, Beijing (CN); Xiaoyu Huang, Beijing (CN); Yang Hu, Beijing (CN); Yuanhui Guo, Beijing (CN); Wei Zhang, Beijing (CN); Xia Shi, Beijing (CN); Chuang Chen, Beijing (CN); Jie Han, Beijing (CN)

(73) Assignees: Wuhan BOE Optoelectronics Technology Co., Ltd., Hubei (CN); Beijing BOE Technology Development Co., Ltd., Beijing (CN)

( * ) Notice: Subject to any disclaimer, the term of this patent is extended or adjusted under 35 U.S.C. 154(b) by 140 days.

(21) Appl. No.: 18/022,794

(22) PCT Filed: Mar. 4, 2022

(86) PCT No.: PCT/CN2022/079228
§ 371 (c)(1),
(2) Date: Feb. 23, 2023

(87) PCT Pub. No.: WO2022/257511
PCT Pub. Date: Dec. 15, 2022

(65) Prior Publication Data
US 2023/0361130 A1    Nov. 9, 2023

(30) Foreign Application Priority Data

Jun. 9, 2021   (CN) .......................... 202110643431.X

(51) Int. Cl.
*G09G 3/36*   (2006.01)
*G02F 1/1362*   (2006.01)
(Continued)

(52) U.S. Cl.
CPC ....... *H10D 86/60* (2025.01); *G02F 1/136209* (2013.01); *G02F 1/136222* (2021.01); *G02F 1/136286* (2013.01); *H10D 86/441* (2025.01)

(58) Field of Classification Search
CPC ......... G02F 1/133707; G02F 1/133512; G02F 1/134309; G02F 1/134363;
(Continued)

(56) References Cited

U.S. PATENT DOCUMENTS 8,045,104 B2 * 10/2011 Cho ................... G02F 1/134363
349/110
9,086,601 B2 * 7/2015 Jeong ................ G02F 1/134309
(Continued)

FOREIGN PATENT DOCUMENTS

CN    102156367 A    8/2011
CN    104808384 A    7/2015
(Continued)

*Primary Examiner* — Joe H Cheng
(74) *Attorney, Agent, or Firm* — HOUTTEMAN LAW LLC

(57) ABSTRACT

An array substrate (10) includes: a base plate; gate lines (11), data lines (12), and pixel units, all on the base plate, wherein each pixel unit includes a display electrode (13) having at least one electrode portion (131), each electrode portion (131) includes a main chain electrode (1311) and branch chain electrodes (1312) all electrically connected to the main chain electrode (1311); and a black matrix layer (14) on a side of the pixel units distal to the base plate, wherein the black matrix layer (14) includes openings (141) and a light shielding portion (142). On the base plate, an orthogonal projection of each opening (141) covers orthogonal projections of the branch chain electrodes (1312) of one corre-
(Continued)

sponding display electrode (13), and an orthogonal projection of the light shielding portion (142) covers orthogonal projections of the gate lines (11), the data lines (12) and the main chain electrode (1311).

20 Claims, 3 Drawing Sheets

(51) Int. Cl.
    *H10D 86/40*         (2025.01)
    *H10D 86/60*         (2025.01)

(58) Field of Classification Search
    CPC ......... G02F 1/136209; G02F 1/136222; G02F 1/136286; H10D 86/60; H10D 86/441
    See application file for complete search history.

(56) References Cited

U.S. PATENT DOCUMENTS

| | | | |
|---|---|---|---|
| 9,857,640 B2* | 1/2018 | Choi | G02F 1/133707 |
| 9,952,475 B2* | 4/2018 | Kim | G02F 1/13624 |
| 10,467,972 B2* | 11/2019 | Kim | G09G 3/3614 |
| 11,435,622 B2* | 9/2022 | Lee | G02F 1/133707 |
| 12,117,696 B2* | 10/2024 | Guo | G02F 1/134309 |
| 2001/0007490 A1* | 7/2001 | Ohta | G02F 1/134363 349/139 |
| 2007/0052900 A1 | 3/2007 | Cho et al. | |
| 2010/0231544 A1* | 9/2010 | Lu | G06F 3/0412 174/250 |
| 2012/0033149 A1* | 2/2012 | Song | G02F 1/136286 349/42 |
| 2013/0300994 A1* | 11/2013 | Wu | G02F 1/133753 349/129 |

FOREIGN PATENT DOCUMENTS

| | | |
|---|---|---|
| CN | 106405967 A | 2/2017 |
| CN | 106444171 A | 2/2017 |
| CN | 109581761 A | 4/2019 |
| CN | 110928066 A | 3/2020 |
| CN | 111505870 A | 8/2020 |
| CN | 111580309 A | 8/2020 |
| CN | 112130382 A | 12/2020 |
| CN | 113238419 A | 8/2021 |
| CN | 215576039 U | 1/2022 |
| KR | 20130027370 A | 3/2013 |

* cited by examiner

ARRAY SUBSTRATE, DISPLAY PANEL AND DISPLAY DEVICE

CROSS-REFERENCE TO RELATED APPLICATIONS

This is a National Phase Application filed under 35 U.S.C. 371 as a national stage of PCT/CN2022/079228 filed on Mar. 4, 2022, an application claiming priority to Chinese patent application No. 202110643431.X, entitled "array substrate, display panel and display device", and filed on Jun. 9, 2021, the entire content of each of which is incorporated herein by reference.

TECHNICAL FIELD

The present disclosure relates to the field of display technology, and in particular to an array substrate, a display panel, and a display device.

BACKGROUND

With the development of display technologies, a resolution of an electronic device such as a display panel, a television, a mobile phone, or the like is higher and higher, and the increase of the resolution corresponds to an increase of the number of pixels. The increase of the number of pixels will result in various technical problems needing to be overcome.

An existing product with a resolution of 8 K has a high pixel density (e.g., pixels per inch, PPI), and thus has small pixels and a low overall aperture ratio. Thus, it is a problem to be solved urgently in the art to greatly improve a contrast of the product while ensuring each pixel having a desired transmittance.

SUMMARY

Some embodiments of the present disclosure provide an array substrate, a display panel, and a display device.

In a first aspect, embodiments of the present disclosure provide an array substrate, including:
  a base plate;
  a plurality of gate lines, a plurality of data lines, and a plurality of pixel units, which are all on the base plate, wherein the plurality of gate lines cross over the plurality of data lines to define the plurality of pixel units, each of the plurality of pixel units includes a display electrode, the display electrode includes at least one electrode portion, each electrode portion includes a main chain electrode and a plurality of branch chain electrodes, and the plurality of branch chain electrodes are all electrically connected to the main chain electrode; and
  a black matrix layer on a side of the pixel units distal to the base plate, wherein the black matrix layer includes a plurality of openings and a light shielding portion, an orthogonal projection of each opening on the base plate covers orthogonal projections of the branch chain electrodes of one corresponding display electrode on the base plate, and an orthogonal projection of the light shielding portion on the base plate covers orthogonal projections of the gate lines, the data lines and the main chain electrode on the base plate.

Optionally, each display electrode includes a plurality of electrode portions, and main chain electrodes of any adjacent two of the plurality of electrode portions are located on different sides of the branch chain electrodes, respectively.

Optionally, the main chain electrodes of any adjacent two of the plurality of electrode portions are electrically connected to each other by a connecting electrode.

Optionally, the connecting electrode is between any adjacent two of the plurality of electrode portions, and has the same extending direction as an extending direction of each branch chain electrode.

Optionally, the extending direction of the connecting electrode is parallel to the extending direction of each branch chain electrode.

Optionally, an angle between the connecting electrode and each main chain electrode is greater than or equal to 90 degrees.

Optionally, an angle between the extending direction of each branch chain electrode and an extending direction of each gate line ranges from 7 degrees to 20 degrees.

Optionally, the pixel units are arranged in an array on the base plate, each pixel unit includes a plurality of sub-pixels, shapes of the openings of the black matrix layer corresponding to the sub-pixels of each pixel unit are different from each other, shapes of the openings of the black matrix layer corresponding to the sub-pixels of any adjacent two pixel units are different from each other, and the pixel units corresponding to the openings having a same shape are spaced apart from each other.

Optionally, the main chain electrode has a width greater than or equal to 2.3 microns and less than or equal to 3 microns, and each of the plurality of branch chain electrodes has a width greater than or equal to 1.3 microns and less than or equal to 2.2 microns.

Optionally, the light shielding portion includes a main body portion and protruding portions, an orthogonal projection of each of the protruding portions on the base plate covers an orthogonal projection of one corresponding main chain electrode on the base plate, and each of the protruding portions has a width ranging from 13 microns to 25 microns.

In a second aspect, embodiments of the present disclosure provide a display panel, which includes a color filter substrate and an array substrate, wherein the array substrate includes:
  a base plate;
  a plurality of gate lines, a plurality of data lines, and a plurality of pixel units, which are all on the base plate, wherein the plurality of gate lines cross over the plurality of data lines to define the plurality of pixel units, each of the plurality of pixel units includes a display electrode, the display electrode includes at least one electrode portion, each electrode portion includes a main chain electrode and a plurality of branch chain electrodes, and the plurality of branch chain electrodes are all electrically connected to the main chain electrode; and
  the color filter substrate includes:
  a black matrix layer on a side of the pixel units distal to the base plate, wherein the black matrix layer includes a plurality of openings and a light shielding portion, an orthogonal projection of each opening on the base plate covers orthogonal projections of the branch chain electrodes of one corresponding display electrode on the base plate, and an orthogonal projection of the light shielding portion on the base plate covers orthogonal projections of the gate lines, the data lines and the main chain electrode on the base plate.

Optionally, each display electrode includes a plurality of electrode portions, and main chain electrodes of any adjacent two of the plurality of electrode portions are located on different sides of the branch chain electrodes, respectively.

Optionally, the main chain electrodes of any adjacent two of the plurality of electrode portions are electrically connected to each other by a connecting electrode.

Optionally, the connecting electrode is between any adjacent two of the plurality of electrode portions, and has the same extending direction as an extending direction of each branch chain electrode.

Optionally, the extending direction of the connecting electrode is parallel to the extending direction of each branch chain electrode.

Optionally, an angle between the connecting electrode and each main chain electrode is greater than or equal to 90 degrees.

Optionally, an angle between the extending direction of each branch chain electrode and an extending direction of each gate line ranges from 7 degrees to 20 degrees.

Optionally, the pixel units are arranged in an array on the base plate, each pixel unit includes a plurality of sub-pixels, shapes of the openings of the black matrix layer corresponding to the sub-pixels of each pixel unit are different from each other, shapes of the openings of the black matrix layer corresponding to the sub-pixels of any adjacent two pixel units are different from each other, and the pixel units corresponding to the openings having a same shape are spaced apart from each other.

Optionally, the main chain electrode has a width greater than or equal to 2.3 microns and less than or equal to 3 microns, and each of the plurality of branch chain electrodes has a width greater than or equal to 1.3 microns and less than or equal to 2.2 microns.

Optionally, the light shielding portion includes a main body portion and protruding portions, an orthogonal projection of each of the protruding portions on the base plate covers an orthogonal projection of one corresponding main chain electrode on the base plate, and each of the protruding portions has a width ranging from 13 microns to 25 microns.

Optionally, the display panel further includes a color resist structure in each of the openings of the black matrix layer.

In a third aspect, embodiments of the present disclosure provide a display device, which includes the array substrate as described above or the display panel as described above.

BRIEF DESCRIPTION OF THE DRAWINGS

The accompanying drawings, which are included to provide a further understanding of the present disclosure and are a part of this specification, explain the present disclosure together with the following exemplary embodiments, but are not intended to limit the present disclosure. In the drawings.

DETAILED DESCRIPTION OF EMBODIMENTS

Figure 1:
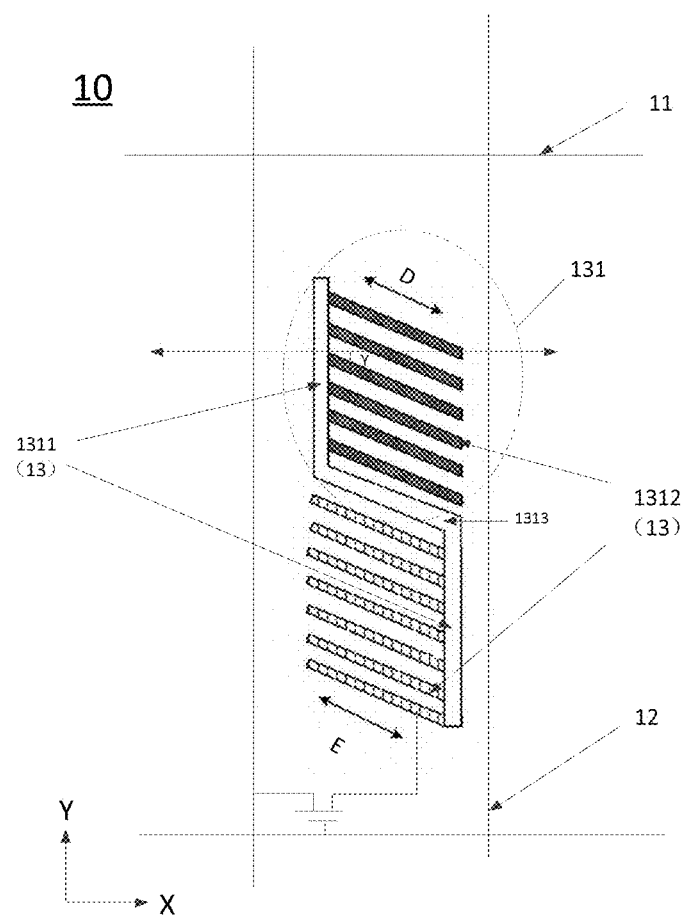
FIG. 1 is a schematic diagram showing a structure of an exemplary array substrate.

To help one of ordinary skill in the art better understand technical solutions of the present disclosure, the present disclosure will be further described below in detail with reference to the accompanying drawings and exemplary embodiments.

Unless defined otherwise, technical or scientific terms used herein shall have the ordinary meaning as understood by one of ordinary skill in the art to which the present disclosure belongs. The terms of "first", "second", and the like used in this disclosure are not intended to indicate any order, quantity, or importance, but rather are used for distinguishing one element from another. Further, the terms "a", "an", "the", and the like do not denote a limitation of quantity, but rather denote the presence of at least one element. The term "comprise", "include", or the like, means that the element or item preceding the term contains the element or item listed after the term and its equivalent, but does not exclude the presence of other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

In the related art, a thin film transistor-liquid crystal display (TFT-LCD) panel is a display panel in which a thin film transistor (TFT) and a liquid crystal display panel are combined together by using a micro-electronic fine processing technology. That is, the micro-electronic fine processing technology performed on silicon (Si) is transplanted to large-area glass for generating a TFT array, and the obtained array substrate with the TFT array and another color filter substrate with a color filter layer are aligned and assembled together. Then, the liquid crystal display panel is obtained through subsequent processes such as attaching a polarizer and the like. In the liquid crystal display panel, the array substrate generally includes a pixel electrode and a thin film transistor for controlling a sub-pixel to be turned on or off, and the color filter substrate generally includes a common electrode, a black matrix and a color resist structure. When an electric field for controlling rotation of liquid crystal molecules is formed between the pixel electrode and the common electrode, a light ray penetrates through the array substrate and irradiates on a liquid crystal molecule layer, is emitted to the color filter substrate after rotated by the liquid crystal molecules, and can be emitted from a surface of the display panel in forms of red, green and blue light after passing through the color resists of red, green and blue on the color filter substrate, thereby finally forming a pattern display on the surface of the display panel.

As shown in FIG. 1, an exemplary array substrate 10 is provided. The array substrate 10 includes a base plate, a plurality of gate lines 11 extending along an X direction, and a plurality of data lines 12 extending along a Y direction. The plurality of gate lines 11 cross over the plurality of data lines 12 to define a plurality of pixel units, and each of the plurality of pixel units includes a display electrode 13, where the display electrode may be a common electrode or a pixel electrode, and the present embodiment is described by taking an example in which the display electrode is the pixel electrode.

It should be noted that in the present embodiment, each pixel unit may include not only the pixel electrode 13 as described above, but also a thin film transistor and a common electrode. The pixel electrode 13 is a slit electrode, and the common electrode is a plate electrode, where the common electrode is closer to the base plate than the pixel electrode. In addition, in the present embodiment, description is given by taking an example in which gate electrodes of the thin film transistors in the pixel units arranged side by side in the X direction (i.e., in each row) are connected to a same gate line 11, and source electrodes of the thin film transistors in the pixel units arranged side by side in the Y direction (i.e., in each column) are connected to a same data line 12. The pixel electrode 13 in each pixel unit is connected to a drain electrode of the thin film transistor. In the present embodiment, the X direction and the Y direction may alternatively be any other directions as long as the X direction and the Y direction intersect each other, which is not specifically limited herein.

As shown in FIG. 1, each pixel electrode 13 in the array substrate 10 includes at least one electrode portion 131, and each electrode portion 131 includes a main chain electrode (or "main electrode" for brevity) 1311 extending along the Y direction and a plurality of branch chain electrodes (or "branch electrodes" for brevity) 1312 extending along the X direction, where the plurality of branch chain electrodes 1312 are electrically connected to the main chain electrode 1311, respectively. The present embodiment is described by taking an example in which the pixel electrode 13 includes two electrode portions 131.

Figure 2:
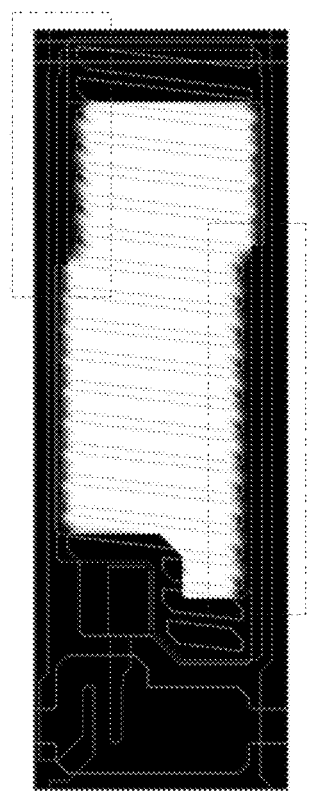
FIG. 2 is a schematic diagram illustrating a light effect of the array substrate shown in FIG. 1.

FIG. 2 is a schematic diagram showing the light effect of the array substrate shown in FIG. 1. As shown in FIG. 2, the liquid crystal molecules are arranged in a disordered manner in a region (or "disordered region" for brevity) where the main chain electrode 1311 is located, causing the region where the main chain electrode 1311 is located not to be able to normally transmit light. Therefore, in a white picture, the disordered region makes a small contribution to a light transmittance, and in a black picture, the disordered region leaks light, which results in an increase in brightness in a dark state, thereby decreasing a display contrast.

Figure 3:
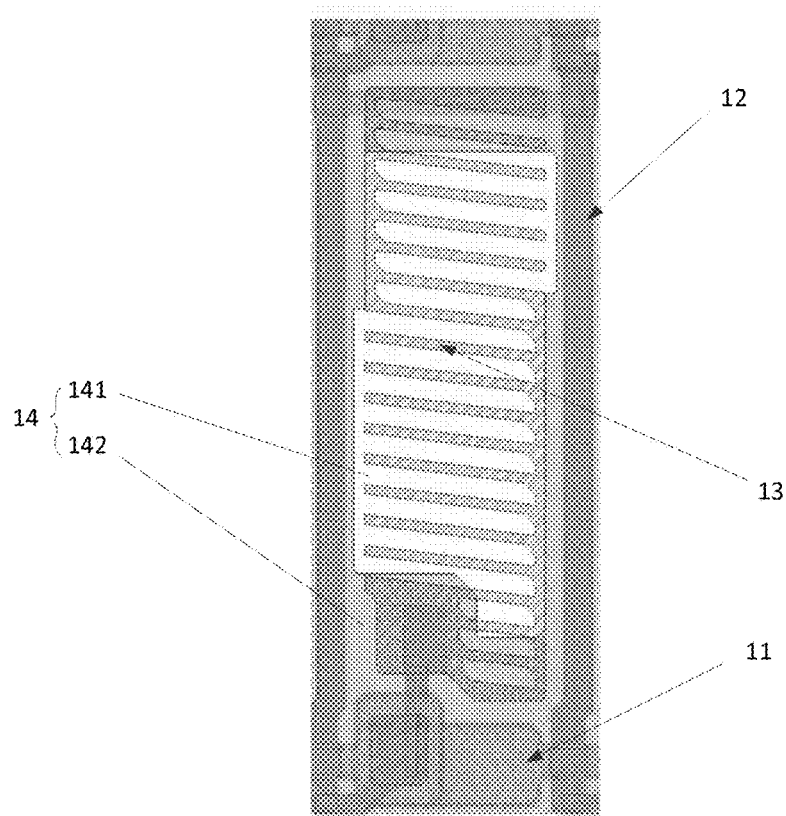
FIG. 3 is a schematic diagram showing a structure of an array substrate according to an embodiment of the present disclosure.

To solve the above problems, an embodiment of the present disclosure provides an array substrate as shown in FIG. 3. This array substrate has substantially the same structure as the array substrate shown in FIG. 1, except that this array substrate further includes a black matrix layer 14 disposed on a side of the pixel unit distal to the base plate, and the black matrix layer 14 includes a plurality of openings 141 and a light shielding portion 142. Each opening 141 of the black matrix layer is disposed corresponding to the pixel electrode 13, such that an orthogonal projection of each opening 141 on the base plate covers orthogonal projections of the branch chain electrodes 1312 of a corresponding pixel electrode 13 on the base plate, and an orthogonal projection of the light shielding portion 142 on the base plate covers orthogonal projections of the gate lines 11, the data lines 12, and the main chain electrodes 1311 on the base plate.

In the present embodiment, since the light shielding portion 142 of the black matrix layer 14 not only covers the gate lines 11 and the data lines 12, but also covers the main chain electrodes 1311, the region, in which the liquid crystal molecules are arranged disorderedly and which corresponds to the main chain electrodes 1311 in each pixel unit, is shielded by the black matrix layer 14 in a case where the array substrate is in a black picture state, such that the risk of light leakage from the region can be reduced, thereby decreasing a brightness of the black picture state. Further, in a case where the array substrate is in a white picture state, the region in which the liquid crystal molecules are arranged disorderedly itself has a small contribution to a light transmittance and has a low light-emitting efficiency, and has a small influence on a brightness of the white picture state after being shielded by the black matrix layer 14, which is equivalent to that the brightness of the white picture state is unchanged while the brightness of the black picture state is reduced, thereby improving the display contrast.

Optionally, a shape of each main chain electrode 1311 and a shape of each branch chain electrode 1312 may be set according to a practical application, and are not particularly limited herein. For example, as shown in FIG. 1, each main chain electrode 1311 and each branch chain electrode 1312 each may have a strip shape, and when both each main chain electrode 1311 and each branch chain electrode 1312 have the strip shape, a portion, which is occupied by each main chain electrode 1311 and each branch chain electrode 1312, of an area of a corresponding opening 141 can be reduced, thereby increasing the light transmittance. In addition, the number of the main chain electrodes 1311 and the number of the branch chain electrodes 1312 may be set according to a practical application, and are not particularly limited herein.

Further, in order to increase the light transmittance, a material of the main chain electrodes 1311 and the branch chain electrodes 1312 may be a transparent material, such as a metal oxide. Preferably, the main chain electrodes 1311 and the branch chain electrodes 1312 are made of a material of indium tin oxide (ITO).

Optionally, each display electrode 13 may include one or more electrode portions 131. In a case where each display electrode 13 includes a plurality of electrode portions 131, the main chain electrodes 1311 of any adjacent two of the electrode portions 131 are located on different sides of the branch chain electrodes 1312, respectively. As shown in FIG. 1, the present embodiment is described by taking an example in which the number of the electrode portions 131 is two, where the two electrode portions 131 are a first electrode portion and a second electrode portion, respectively. In FIG. 1, since the main chain electrodes 1311 of the first electrode portion and the second electrode portion are located on different sides of the branch chain electrodes 1312, respectively, i.e., the main chain electrode 1311 of the first electrode portion is located on the left side of the branch chain electrodes 1312 of the first electrode portion, and the main chain electrode 1311 of the second electrode portion is located on the right side of the branch chain electrodes 1312 of the second electrode portion, the branch chain electrodes 1312 connected to the main chain electrodes 1311 may be more uniformly distributed on different sides of the main chain electrodes 1311, respectively. As such, the symmetry of the pixel electrode 13 may be improved, and the uniformity of the transmittance of the display panel may be improved.

Optionally, the main chain electrodes 1311 of any adjacent two of the electrode portions 131 are electrically connected to each other by a connecting electrode 1313. For example, as shown in FIG. 1, the main chain electrode 1311 of the first electrode portion and the main chain electrode 1311 of the second electrode portion are connected to each other by the connecting electrode 1313. When a signal is written (or provided) to the pixel electrode 13 through a data line, the signal on the main chain electrodes 1311 can be transmitted to the branch chain electrodes 1312 through the connecting electrode 1313, and thus, a display function can be realized by the cooperation between the pixel electrode and the common electrode.

Optionally, the connecting electrode 1313 is located between any adjacent two of the electrode portions 131, and has the same extending direction as an extending direction of each branch chain electrode 1312.

In the present embodiment, since the connecting electrode 1313 is located between any adjacent two of the electrode portions 131 and has the same extending direction as the extending direction of each of the branch chain electrodes 1312, a light transmittance of each pixel unit can be improved. Preferably, the extending direction of the connecting electrode 1313 is parallel to the extending direction of each branch chain electrode 1312.

Optionally, an angle between the connecting electrode 1313 and an adjacent main chain electrode 1311 is greater than or equal to 90 degrees. In the present embodiment, by setting the angle between the connecting electrode 1313 and the adjacent main chain electrode 1311 to be greater than or equal to 90 degrees, it is possible to prevent the light transmittance of the display panel from being decreased due to each main chain electrode 1311 having a relatively large length.

Optionally, the extending direction of each branch chain electrode 1312 and an extending direction of each gate line 11 form an angle ranging from 7 degrees to 20 degrees.

As shown in FIG. 1, an angle $\gamma$ between the extending directions of each branch chain electrode 1312 and each gate line 11 ranges from 7 degrees to 20 degrees.

If the angle $\gamma$ is set to be smaller, an angle by which the liquid crystal molecules needs to be rotated is too large, and thus a delay will occur when the display panel displays an image. If the angle $\gamma$ is set to be larger, the angle by which the liquid crystal molecules needs to be rotated is too small, it is difficult to determine a rotation direction of the liquid crystal molecules when the liquid crystal molecules are to be rotated, and the time required to determine the rotation direction is long, which causes a delay in displaying an image on the display panel.

Therefore, in the present embodiment, the angle $\gamma$ between the extending directions of each branch chain electrode 1312 and each gate line 11 is set to be in the range of 7 degrees to 20 degrees, for avoiding a delay occurring when the display panel displays an image.

Optionally, pixel units are arranged in an array on the base plate, and each pixel unit includes a plurality of sub-pixels. Shapes of the openings 141 of the black matrix layer 14 corresponding to the sub-pixels in each pixel unit are different from each other, and shapes of the openings 141 of the black matrix layer 14 corresponding to the sub-pixels in any adjacent two pixel units are different from each other. The pixel units corresponding to the openings 141 having a same shape are spaced apart from each other.

Figure 4:
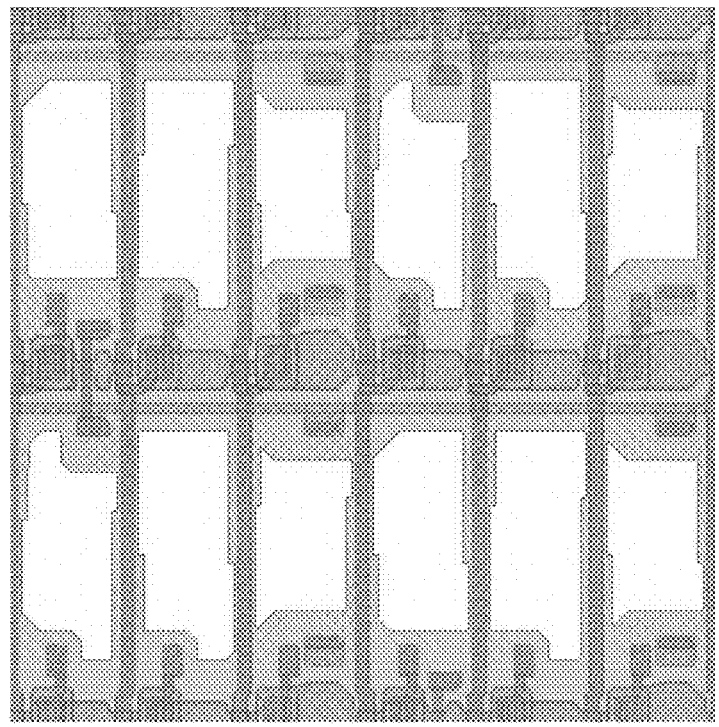
FIG. 4 is a schematic diagram showing a structure of a black matrix layer of another array substrate according to an embodiment of the present disclosure.
Figure 5:
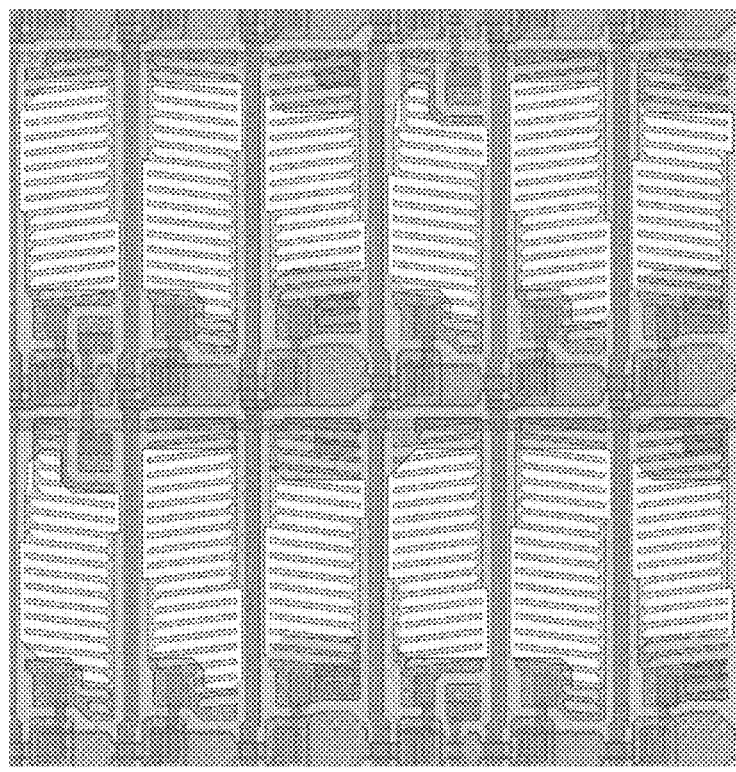
FIG. 5 is a schematic diagram showing a structure of another array substrate according to an embodiment of the present disclosure.

Specifically, as shown in FIGS. 4 and 5, the present embodiment is described by taking an example in which four pixel units are shown and each pixel unit includes three sub-pixels. In the present embodiment, four pixel units are arranged in an array on the base plate, and each pixel unit includes three sub-pixels, the shapes of the openings 141 of the black matrix layer 14 corresponding to the three sub-pixels are different from each other. Further, the shapes of the openings 141 of the black matrix layer 14 corresponding to the sub-pixels of any adjacent two pixel units are different from each other, and the pixel units corresponding to the openings 141 having a same shape are spaced apart from each other. Further, the shapes of the openings 141 of the black matrix layer 14 corresponding to the sub-pixels of any two pixel units on a same diagonal (i.e., a same diagonal line) are the same (i.e., are identical with each other). As such, it is ensured that any two adjacent rows of pixel units have a same light transmittance, thereby improving both the defect of ripple (i.e., Mura) and a viewing angle.

Optionally, a width of each main chain electrode 1311 may be greater than or equal to 2.3 μm and less than or equal to 3 μm. That is, the width of each main chain electrode 1311 should be neither too small nor too large. The above range of width can, on one hand, prevent each main chain electrode 1311 from being broken due to the main chain electrode 1311 having a too small width, and on the other hand, can prevent the light transmittance of the display panel from being decreased due to each main chain electrode 1311 having a too large width.

Further, a width of each branch chain electrode 1312 may be greater than or equal to 1.3 μm and less than or equal to 2.2 μm. That is, each branch chain electrode 1312 may have a width smaller than the width of each main chain electrode 1311, and the width of each branch chain electrode 1312 should not be too small, such that the branch chain electrode 1312 can be prevented from being broken while the light transmittance of the display panel is improved.

Optionally, as shown in FIG. 3, the light shielding portion 142 includes a main body portion and protruding portions, and an orthogonal projection of each protruding portion on the base plate covers an orthogonal projection of a corresponding main chain electrode 1311 on the base plate. A width of each protruding portion is in a range from 13 microns to 25 microns. In the present embodiment, since the width of each protruding portion ranges from 13 microns to 25 microns, a contrast ratio of display can be improved while an aperture ratio is ensured.

In a second aspect, an embodiment of the present disclosure provides a display panel, which includes a color filter substrate and the array substrate. Specifically, the array substrate includes the base plate, the plurality of gate lines, and the plurality of data lines crossing over the plurality of gate lines, where the plurality of gate lines and the plurality of data lines are arranged on the base plate to define a plurality of pixel units. Each of the plurality of pixel units includes the display electrode. The display electrode includes at least one electrode portion. Each electrode portion includes a main chain electrode and a plurality of branch chain electrodes, and the plurality of branch chain electrodes are all electrically connected to the main chain electrode.

The color filter substrate includes a black matrix layer and a color resist structure. The black matrix layer includes a plurality of openings and a light shielding portion, and the color resist structure is arranged in the openings of the black matrix layer. The black matrix layer is arranged on a side of the pixel units distal to the base plate. The orthogonal projection of each opening on the base plate covers the orthogonal projections of the branch chain electrodes of a corresponding display electrode on the base plate, and the orthogonal projection of the light shielding portion on the base plate covers the orthogonal projections of the gate lines, the data lines and the main chain electrodes on the base plate.

In the present embodiment, since the light shielding portion of the black matrix layer not only covers the gate lines and the data lines, but also covers the main chain electrodes, the region, in which the liquid crystal molecules are arranged disorderedly and which corresponds to the main chain electrodes in each pixel unit, is shielded by the black matrix layer in a case of a black picture state, such that the risk of light leakage from the region can be reduced, thereby decreasing a brightness of the black picture state. Further, in a case of a white picture state, the region in which the liquid crystal molecules are arranged disorderedly itself has a small contribution to a light transmittance and has a low light-emitting efficiency, and has a small influence on a brightness of the white picture state after being shielded by the black matrix layer, which is equivalent to that the brightness of the white picture state is unchanged while the brightness of the black picture state is reduced, thereby improving the display contrast.

The following embodiments will be described by taking an example in which the black matrix layer is disposed on the color filter substrate, and the principle thereof is the same as the principle of the embodiment that the black matrix layer is disposed on the array substrate. Therefore, the effect and the principle in the following embodiments are not repeated.

Optionally, each display electrode includes a plurality of electrode portions, and the main chain electrodes of any adjacent two of the electrode portions are located on different sides of the branch chain electrodes, respectively.

Optionally, the main chain electrodes of any adjacent two of the electrode portions are electrically connected to each other by a connecting electrode.

Optionally, the connecting electrode is located between any adjacent two of the electrode portions, and has the same extending direction as an extending direction of each branch chain electrode.

Optionally, the extending direction of the connecting electrode is parallel to the extending direction of each branch chain electrode.

Optionally, an angle between the connecting electrode and an adjacent main chain electrode is greater than or equal to 90 degrees.

Optionally, an angle between the extending direction of each branch chain electrode and the extending direction of each gate line ranges from 7 degrees to 20 degrees.

Optionally, the pixel units are arranged in an array on the base plate, and each pixel unit includes a plurality of sub-pixels. The shapes of the openings of the black matrix layer corresponding to the sub-pixels in each pixel unit are different from each other, and the shapes of the openings of the black matrix layer corresponding to the sub-pixels in any adjacent two pixel units are different from each other. The pixel units corresponding to the openings having a same shape are spaced apart from each other.

Optionally, the width of each main chain electrode is greater than or equal to 2.3 microns and less than or equal to 3 microns, and the width of each branch chain electrode is greater than or equal to 1.3 microns and less than or equal to 2.2 microns.

Optionally, the light shielding portion includes a main body portion and protruding portions, and an orthogonal projection of each protruding portion on the base plate covers an orthogonal projection of a corresponding main chain electrode on the base plate. The width of each protruding portion ranges from 13 microns to 25 microns.

In a third aspect, an embodiment of the present disclosure provides a display device, which includes the array substrate or the display panel as described above.

It should be understood that the above embodiments are merely exemplary embodiments employed to illustrate the principle of the present disclosure, and the present disclosure is not limited thereto. It will be apparent to one of ordinary skill in the art that various changes and modifications may be made therein without departing from the spirit and scope of the present disclosure, and such changes and modifications are to be considered to fall within the scope of the present disclosure.

What is claimed is:

1. An array substrate, comprising:
   a base plate;
   a plurality of gate lines, a plurality of data lines, and a plurality of pixel units, which are all on the base plate, wherein the plurality of gate lines cross over the plurality of data lines to define the plurality of pixel units, each of the plurality of pixel units comprises a display electrode, the display electrode comprises at least one electrode portion, each electrode portion comprises a main chain electrode and a plurality of branch chain electrodes, and the plurality of branch chain electrodes are all electrically connected to the main chain electrode; and
   a black matrix layer on a side of the pixel units distal to the base plate, wherein the black matrix layer comprises a plurality of openings and a light shielding portion, an orthogonal projection of each opening on the base plate covers orthogonal projections of the branch chain electrodes of one corresponding display electrode on the base plate, and an orthogonal projection of the light shielding portion on the base plate covers orthogonal projections of the gate lines, the data lines and the main chain electrode on the base plate.

2. The array substrate according to claim 1, wherein each display electrode comprises a plurality of electrode portions, and main chain electrodes of any adjacent two of the plurality of electrode portions are located on different sides of the branch chain electrodes, respectively.

3. The array substrate according to claim 2, wherein the main chain electrodes of any adjacent two of the plurality of electrode portions are electrically connected to each other by a connecting electrode.

4. The array substrate according to claim 3, wherein the connecting electrode is between any adjacent two of the plurality of electrode portions, and has the same extending direction as an extending direction of each branch chain electrode.

5. The array substrate according to claim 4, wherein the extending direction of the connecting electrode is parallel to the extending direction of each branch chain electrode.

6. The array substrate according to claim 5, wherein an angle between the connecting electrode and each main chain electrode is greater than or equal to 90 degrees.

7. The array substrate according to claim 5, wherein an angle between the extending direction of each branch chain electrode and an extending direction of each gate line ranges from 7 degrees to 20 degrees.

8. The array substrate according to claim 1, wherein the pixel units are arranged in an array on the base plate, each pixel unit comprises a plurality of sub-pixels, shapes of the openings of the black matrix layer corresponding to the sub-pixels of each pixel unit are different from each other, shapes of the openings of the black matrix layer corresponding to the sub-pixels of any adjacent two pixel units are different from each other, and the pixel units corresponding to the openings having a same shape are spaced apart from each other.

9. The array substrate according to claim 1, wherein the main chain electrode has a width greater than or equal to 2.3 microns and less than or equal to 3 microns, and each of the plurality of branch chain electrodes has a width greater than or equal to 1.3 microns and less than or equal to 2.2 microns; or
   wherein the light shielding portion comprises a main body portion and protruding portions, an orthogonal protection of each of the protruding portions on the base plate covers an orthogonal projection of one corresponding main chain electrode on the base plate, and each of the protruding portions has a width ranging from 13 microns to 25 microns.

10. A display device, comprising the array substrate according to claim 1.

11. A display panel, comprising a color filter substrate and an array substrate, wherein the array substrate comprises:
a base plate;
a plurality of gate lines, a plurality of data lines, and a plurality of pixel units, which are all on the base plate, wherein the plurality of gate lines cross over the plurality of data lines to define the plurality of pixel units, each of the plurality of pixel units comprises a display electrode, the display electrode comprises at least one electrode portion, each electrode portion comprises a main chain electrode and a plurality of branch chain electrodes, and the plurality of branch chain electrodes are all electrically connected to the main chain electrode; and
the color filter substrate comprises:
a black matrix layer on a side of the pixel units distal to the base plate, wherein the black matrix layer comprises a plurality of openings and a light shielding portion, an orthogonal projection of each opening on the base plate covers orthogonal projections of the branch chain electrodes of one corresponding display electrode on the base plate, and an orthogonal projection of the light shielding portion on the base plate covers orthogonal projections of the gate lines, the data lines and the main chain electrode on the base plate.

12. The display panel according to claim 11, wherein each display electrode comprises a plurality of electrode portions, and main chain electrodes of any adjacent two of the plurality of electrode portions are located on different sides of the branch chain electrodes, respectively.

13. The display panel according to claim 12, wherein the main chain electrodes of any adjacent two of the plurality of electrode portions are electrically connected to each other by a connecting electrode.

14. The display panel according to claim 13, wherein the connecting electrode is between any adjacent two of the plurality of electrode portions, and has the same extending direction as an extending direction of each branch chain electrode.

15. The display panel according to claim 14, wherein the extending direction of the connecting electrode is parallel to the extending direction of each branch chain electrode.

16. The display panel according to claim 15, wherein an angle between the connecting electrode and each main chain electrode is greater than or equal to 90 degrees.

17. The display panel according to claim 15, wherein an angle between the extending direction of each branch chain electrode and an extending direction of each gate line ranges from 7 degrees to 20 degrees.

18. The display panel according to claim 11, wherein the pixel units are arranged in an array on the base plate, each pixel unit comprises a plurality of sub-pixels, shapes of the openings of the black matrix layer corresponding to the sub-pixels of each pixel unit are different from each other, shapes of the openings of the black matrix layer corresponding to the sub-pixels of any adjacent two pixel units are different from each other, and the pixel units corresponding to the openings having a same shape are spaced apart from each other.

19. The display panel according to claim 11, wherein the main chain electrode has a width greater than or equal to 2.3 microns and less than or equal to 3 microns, and each of the plurality of branch chain electrodes has a width greater than or equal to 1.3 microns and less than or equal to 2.2 microns;
wherein the light sb ding portion comprise ody portio and protruding portions, an orthoxd al projection of each of the protruding portions on the base plate covers an orthoRc projection of one corresponding main chain electrode on the base plate and each of the protruding portions has a width ranging from 13 microns to 25microns; or
wherein the display panel further comprises a color resist structure in each of the openings of the black matrix layer.

20. A display device, comprising the display panel according to claim 11.

* * * * *